(12) United States Patent
Lee et al.

(10) Patent No.: US 7,465,073 B2
(45) Date of Patent: Dec. 16, 2008

(54) BACKLIGHT UNIT AND LIQUID CRYSTAL DISPLAY DEVICE HAVING THE SAME

(75) Inventors: Sun-Hwa Lee, Gyeonggi-do (KR); Deuk-Su Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 128 days.

(21) Appl. No.: 11/312,538

(22) Filed: Dec. 21, 2005

(65) Prior Publication Data

US 2007/0002579 A1 Jan. 4, 2007

(30) Foreign Application Priority Data

Jun. 29, 2005 (KR) .................. 10-2005-0057343

(51) Int. Cl.
*F21S 4/00* (2006.01)
*F21V 5/00* (2006.01)
(52) U.S. Cl. .................. 362/330; 362/224; 362/561
(58) Field of Classification Search ......... 362/612–614, 362/561, 607, 330, 231, 224, 225, 800; 349/61, 349/64, 68–70
See application file for complete search history.

(56) References Cited

U.S. PATENT DOCUMENTS

| 6,039,451 | A | 3/2000 | Grave |
| 7,040,794 | B2* | 5/2006 | Bernard ...................... 362/555 |
| 7,193,356 | B2* | 3/2007 | Kokubo et al. .............. 313/495 |
| 2002/0126478 | A1* | 9/2002 | Cornelissen et al. ........ 362/228 |
| 2005/0135115 | A1* | 6/2005 | Lamb et al. ................. 362/613 |
| 2007/0097708 | A1* | 5/2007 | Shim et al. .................. 362/620 |

* cited by examiner

*Primary Examiner*—Bao Q Truong
(74) *Attorney, Agent, or Firm*—McKenna Long & Aldridge LLP

(57) ABSTRACT

A backlight unit of an LCD device is provided. The backlight unit includes a light emitting unit, a light guide plate, a reflection plate and a light scattering unit. The light emitting unit has a passive light emission lamp that generates green light and a self-light emission lamp that generates red and blue light. The light guide plate is disposed between the passive light emission lamp and the self-light emission lamp. The light guide plate mixes the red and blue light emitted from the self-light emission type lamp and guides the mixed light to an upper side thereof. The reflection plate is disposed below the self-light emission lamp. In addition, the light scattering unit is disposed above the passive light emission type lamp.

12 Claims, 3 Drawing Sheets

BACKLIGHT UNIT AND LIQUID CRYSTAL DISPLAY DEVICE HAVING THE SAME

This application claims the benefit of Korean Patent Application No. 10-2005-0057343, filed on Jun. 29, 2005, which is hereby incorporated by reference for all purposes as if fully set forth herein.

BACKGROUND OF THE INVENTION

1. Field of the Invention

The present invention relates to a liquid crystal display (LCD) device and, more particularly, to a backlight unit which enhances luminance and color reproduction quality of a LCD and a LCD device having the backlight unit.

2. Description of the Background Art

In general, a LCD device includes a thin film transistor (TFT) array substrate and a color filter substrate which face each other, a liquid crystal display panel having a liquid crystal layer formed between the two substrates, a driving unit for driving the liquid crystal panel, and a backlight unit for supplying light to the liquid crystal panel.

The TFT array substrate includes a plurality of data lines vertically arranged with an interval therebetween, a plurality of gate lines horizontally arranged with an interval therebetween, and a pixel defined at each crossing of the data line and the gate line such that the pixels are formed in a matrix form.

The color filter substrate includes a red, green and blue color filter layer formed at positions corresponding to the pixels. Additionally, the color filter also has a black matrix for preventing light leakage between the color filters. The black matrix prevents color interference of light passing through the pixels.

A common electrode and a pixel electrode face inner surfaces of the color filter substrate and the TFT array substrate, respectively. The common electrode and the pixel electrode apply an electric field to the liquid crystal layer. Here, the pixel electrode is formed on the TFT array substrate according to each pixel and the common electrode is integrally formed on the surface of the color filter substrate. An arrangement of the liquid crystal molecules in the liquid crystal layer may be controlled by controlling a voltage applied to the pixel electrode. Accordingly, light transmittance of the pixels may be individually controlled by controlling the voltage applied to the pixel electrode.

The backlight unit supplies light to the LCD device. When light emitted from the backlight unit passes through the liquid crystal layer, the arrangement of the liquid crystals controls light transmittance and an image is displayed. Typically, there are two types of backlight units, an edge type backlight unit and a direct type backlight unit. The type of unit depends on the position of lamps which are used as the light source.

In an edge type backlight unit, a lamp is disposed at either one side or both sides of the liquid crystal panel. Light generated from the lamp is projected on the screen of the liquid crystal panel with a light guide plate.

Direct type backlight units include a plurality of fluorescent lamps that are arranged in a row and irradiate light onto a surface of the liquid crystal panel. As the size of liquid crystal panels have increased to over 20 inches, greater emphasis has been placed on the development direct type backlight units. The direct type backlight unit is more efficient than the edge type backlight unit. Thus, the direct type backlight unit is commonly used for applications requiring high luminance, such as a large-screen LCD device.

Typically, a CCFL (Cold Cathode Fluorescent Lamp), an HCFL (Hot Cathode Fluorescent Lamp), an EL (Electro Luminescence), an LED (Light Emitting Diode), and the like, are used as light sources in related art backlight units. In addition, of the light sources, the CCFL and the LED lamp are most commonly used.

However, while a fluorescent lamp has luminance which is generally high and uniform, the color reproduction of a fluorescent lamp is subpar. In addition, while a LED or an EL lamp can control partial luminance and implement high quality color reproduction, the luminance and uniformity of LED and EL lamps are low when compared with the CCFL.

SUMMARY OF THE INVENTION

Accordingly, the present invention is directed to a backlight unit and liquid crystal display device having the same that substantially obviates one or more of the problems due to limitations and disadvantages of the related art.

One advantage of the present invention is to provide a backlight unit of a liquid crystal display (LCD) device capable of implementing high luminance and high quality color reproduction.

Another advantage of the present invention is to provide an LCD device capable of implementing high luminance and high quality color reproduction.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described herein, there is provided a backlight unit of an LCD device including a light emitting unit, a light guide plate, a reflection plate and a light scattering unit. The light emitting unit includes a passive light emission type lamp that generates green light and a self-light emission type lamp that generates red and blue light. The light guide plate is disposed between the passive light emission type lamp and the self-light emission type lamp. The light guide plate mixes the red and blue light emitted from the self-light emission type lamp. Additionally, the light guide plate guides the mixed light to an upper side thereof. The reflection plate is disposed below the self-light emission type lamp. The light scattering unit is disposed above the passive light emission type lamp.

To achieve the above advantages, there is also provided a liquid crystal display (LCD) device including a liquid crystal panel and a backlight unit that supplies light to the liquid crystal panel. The backlight unit includes a light emitting unit having a passive light emission type lamp that generates green light and a self-light emission type lamp that generates red and blue light. The backlight unit also has a light guide plate disposed between the passive light emission type lamp and the self-light emission type lamp. The light guide plate mixes the red and blue light emitted from the self-light emission type lamp and guides the mixed light to an upper side thereof. Additionally, the backlight unit has a reflection plate disposed below the self-light emission type lamp and a light scattering unit disposed above the passive light emission type lamp.

Furthermore, a liquid crystal display (LCD) device is disclosed. The LCD device comprises a liquid crystal panel, a backlight unit, a light guide plate and a reflection plate. The backlight unit includes a first light emitting unit having a passive light emission lamp and a second light emitting unit having a self-light emission lamp. The light guide plate is disposed between the first light emitting unit and the second light emitting unit. The reflection plate is below the self-light emission lamp.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of the present invention, example of which is illustrated in the accompanying drawings.

Figure 1:
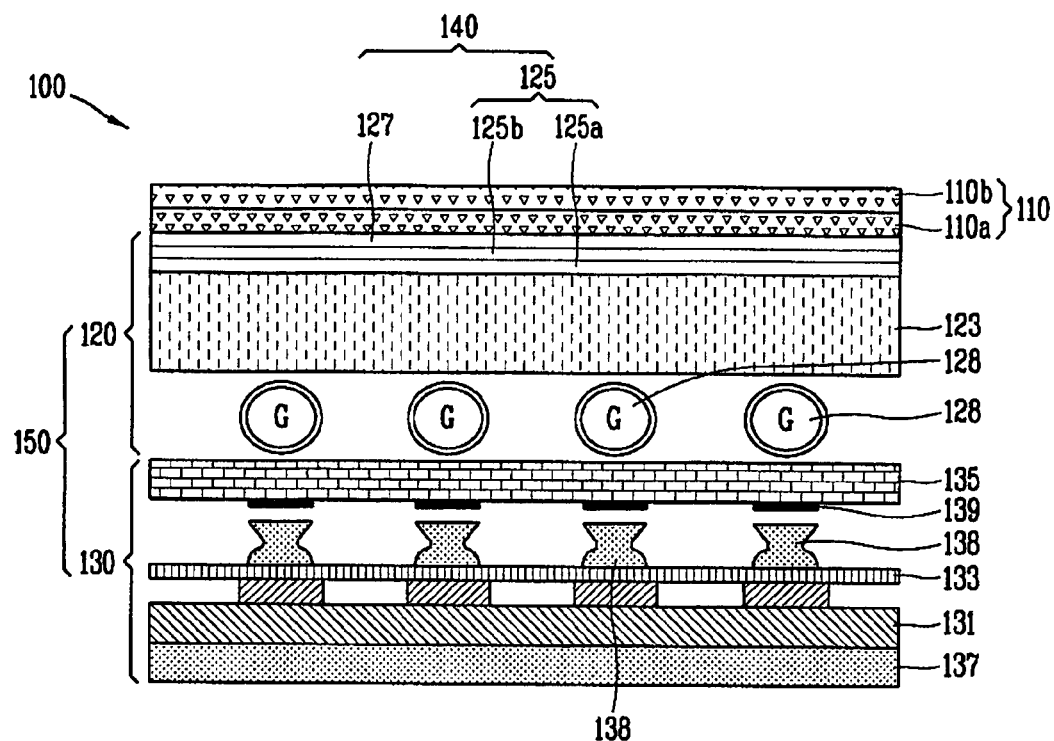
FIG. 1 illustrates a liquid crystal display (LCD) device in accordance with the present invention.
Figure 2:
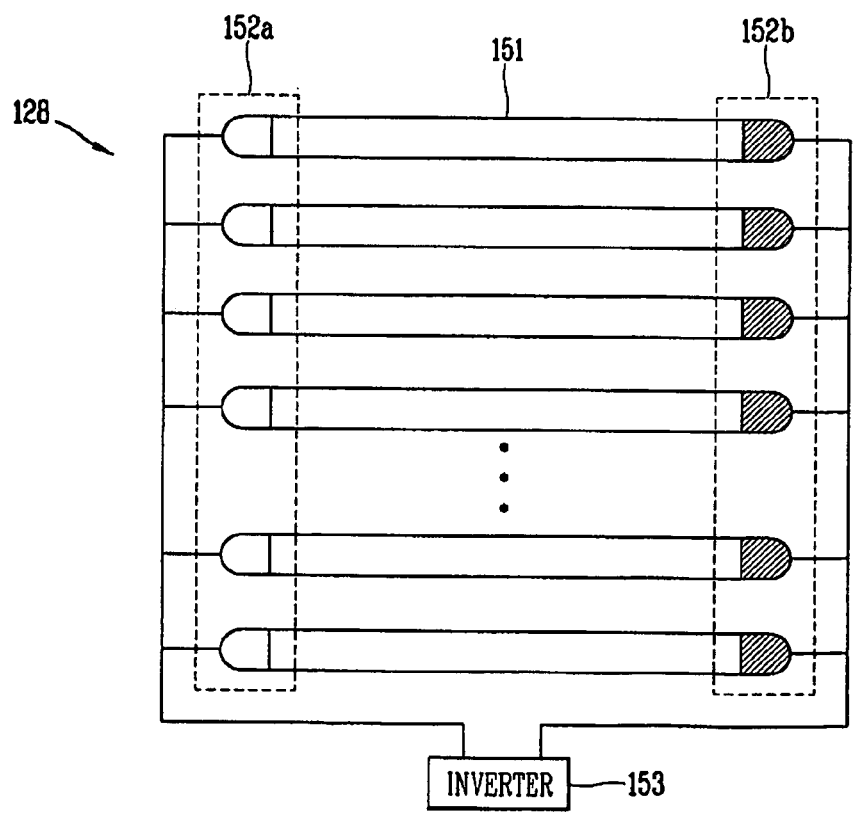
FIG. 2 illustrates first lamps of a first light emitting unit of a backlight unit in accordance with the present invention.
Figure 3:
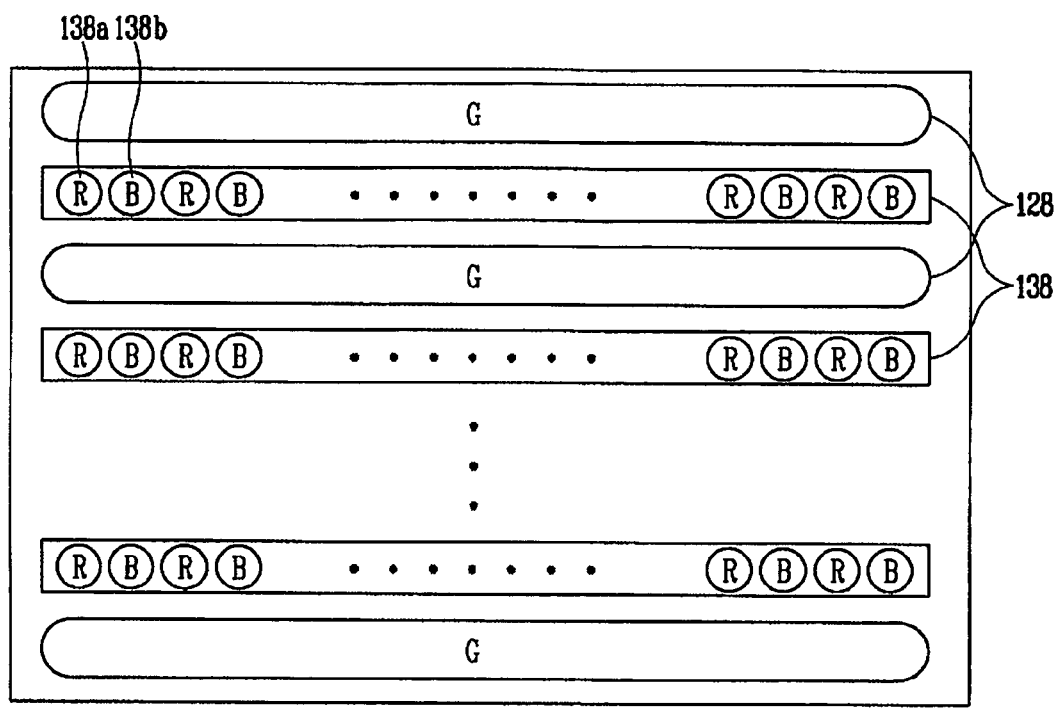
FIG. 3 shows a position of first lamps and second lamps of the LCD in FIG. 1.

FIG. 1 illustrates a liquid crystal display (LCD) device in accordance with the present invention. FIG. 2 illustrates first lamps of a first light emitting unit of a backlight unit in accordance with the present invention. FIG. 3 shows a position of first lamps and second lamps of the LCD in FIG. 1.

First, as shown in FIG. 1, the LCD device 100 in accordance with the present invention may include a liquid crystal panel 110 having a thin film transistor (TFT) array substrate 110a, a color filter substrate 110b and a liquid crystal layer (not shown) formed between the TFT array substrate 110a and the color filter substrate 110b. In addition, the LCD device 100 includes a backlight unit 150 for supplying light to the liquid crystal panel 110.

Though not shown, a plurality of gate lines arranged in a first direction and a plurality of data lines vertically crossing the gate lines thereby defining a plurality of pixel regions arranged in a matrix form are formed on the TFT array substrate 110a. Moreover, the TFT array substrate includes a switching device for switching each pixel.

Red, green, and blue color filter layers are formed on the color filter substrate 110b at positions corresponding to pixels. The color filter substrate 110b also includes a black matrix for preventing light leakage between color filters and color interference of light passing through the pixels.

A pixel electrode and a common electrode that apply an electric field to the liquid crystal layer are formed at an inner surface of the TFT array substrate 110a and the color filter substrate 10b, respectively. Light transmittance of pixels are individually controlled by changing an arrangement of liquid crystal molecules in the liquid crystal layer. The arrangement of the liquid crystal molecules is controlled by applying a voltage between the common electrode and the pixel electrode.

The backlight unit 150 may include a first light emitting unit 120 having passive light emission type first lamps 128 and a second light emitting unit 130 having self-light emission type second lamps 138.

The passive emission type first lamp 128 of the first light emitting unit 120 can be formed as a CCFL (Cold Cathode Fluorescent Lamp) or a HCFL (Hot Cathode Fluorescent Lamp). As shown in FIG. 2, the passive emission type first lamp 128, in a direct method, includes external electrodes 152a and 152b formed at both ends of a glass tube 151 filled with a discharge gas. The external electrodes 152a and 152b apply external power. The external electrodes 152a and 152b are commonly connected with an inverter 153.

When a voltage is applied through the external electrodes 152a and 152b, electrons within the glass tube 151 move to an anode (not shown) and collide with argon for excitation thereof. Upon excitation, the amount of positive ions increase and collide with a cathode, thereby discharging secondary electrons. When the released secondary electrons initiate discharging within the glass tube, the electrons collide with mercury vapor, resulting in ionization that emits ultraviolet rays and visible light. The emitted ultraviolet rays excite the fluorescent material coated on an inner wall of the lamps to emit visible rays, thereby generating green light.

Though not shown, the passive emission type first lamps 128 are disposed at certain intervals with both ends thereof fixed in holes formed at both sides of an outer case. The passive emission type first lamp 128 includes electrodes that apply external power (not shown) at both ends of a glass tube filled with a charge gas. The passive emission type first lamp 128 also has a wire connected with the electrode. Because the wire is connected with an inverter (not shown) that allows connection of the wire with a driving circuit, each lamp needs an inverter.

The first light emitting unit 120 will be described with reference to FIG. 1. A light scattering unit 140 for enhancing the uniformity of light transmitted to the liquid crystal panel 110 is formed at an upper portion of the passive emission type first lamp 128. The light scattering unit 140 includes a diffusion plate 123, first and second prism sheets 125a and 125b, and a protection sheet 127 respectively formed at an upper portion of the diffusion plate 123.

The diffusion plate 123 formed at the upper portion of the passive emission type first lamp 128 scatters light incident from the passive emission type first lamp 128 such that blurs, spots, etc., cannot be generated due to a partial concentration of light. In addition, the diffusion plate 123 changes the direction of light traveling toward the first prism sheet 125a such that light travels in a direction perpendicular to the prism sheet 125a. The first prism sheet 125a has a flat lower surface and a pleated surface with creases in a first direction which extend up and down relative to the first prism sheet 125a. The second prism sheet 125b has a flat lower surface and a pleated surface with creases in a second direction which extend in a left-right direction relative to the second prism sheet 125b where the first and second directions are perpendicular to each other. The first prism sheet 125a collects light traveling toward the second prism sheet 125b in an up and down direction, and the second prism sheet 125b collects light traveling toward the protection sheet 127 in the left-right direction, such that the light traveling toward the protection sheet 127 from the diffusion plate 123 can be changed to travel in a perpendicular direction relative to the protection sheet 127. Accordingly, light passing through the first and second prism sheets 125a and 125b travel in a perpendicular direction relative to the protection sheet 127 such that the light is uniformly distributed over the surface of the protection sheet 127, thereby enhancing overall luminance.

The self-light emission type second lamp 138 of the second light emitting unit 130 may be a LED lamp or an EL lamp. As shown in FIG. 3, the self-light emission type second lamps 138 are disposed between the passive emission type first lamps 128.

The self-light emission type second lamp 138 includes R (red) and B (blue) lamps 138a and 138b linearly disposed in a continuous manner with an interval therebetween.

The self-light emission type second lamps 138 and the passive emission type first lamps 128 are alternately disposed. When light emitted from the self-light emission type second lamp 138 mixes with light emitted from passive emission type first lamp 128, white light is formed. Namely, the red light and the blue light respectively emitted from the R lamp 138a and the B lamp 138b are mixed with the green light emitted from the passive emission type first lamp 128 thereby supplying white light to the liquid crystal panel 110.

Figure 4:
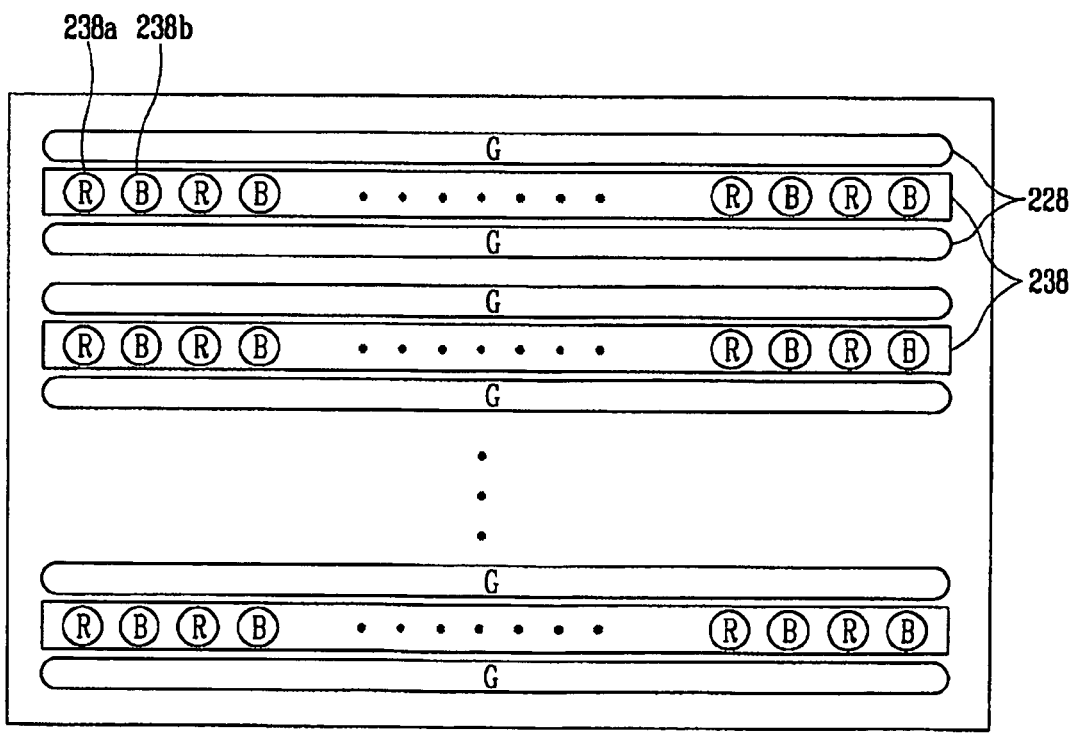
FIG. 4 shows a lamp arrangement in accordance with an alternative embodiment of the present invention.

As shown in FIG. 4, a second lamp 238 may be disposed between two first lamps 228. More specifically, the two first lamps 228 may be provided for each second lamp 238 where the R lamp 238a and the B lamp 238b of the second lamps 238 align with one another, as shown in FIG. 4.

When the second lamp 238 has two first lamps 228 associated therewith, the strength of the green light increases and an overall luminance increases. Also, here, red light and blue light emitted from the second lamp 238 mix with green light emitted from the first lamp 228 thereby supplying white light to the liquid crystal panel.

The second light emitting unit 130 will be described with reference to FIG. 1.

The self-light emission type second lamp 138 is formed on a metal core printed circuit board (MCPCB) 131. In addition, a reflection plate 133 is positioned between the self-light emission type second lamp 138 and the MCPCB 131. The reflection plate 133 reflects light that is scattered at a bottom portion of the reflection plate 133 toward an upper portion of the reflection plate 133. In an embodiment of the present invention, the reflection plate 133 can be made of aluminum (Al) or any other material having reflection characteristics.

The self-emission type lamp, such as the LED lamp, has better luminance and color reproduction properties in comparison with the fluorescent lamps (CCFL and HCFL). However, as an internal temperature of the LED lamp increases, its output luminance reduces. Thus, a heat releasing plate 137 may be provided at a lower surface of the MCPCB 131 to conduct heat away from the lamp 138, thereby minimizing an increase of the internal temperature of the lamp 138. Namely, heat generated inside the LED as the LED lamp generates light conducts to the reflection plate 133 and the MCPCB 131. The heat absorbed by the MCPCB 131 then conducts to the external heat releasing plate 137 from which the heat discharges.

A light guide plate 135 is disposed between the first and second light emitting units 120 and 130. The light guide plate 135 transmits light incident to the self-light emission type second lamp 138 passing therethrough. In one embodiment, the light guide plate 135 may be made of a transparent material such as PMMA (Poly Methly Meth Acrylate), a glass substrate or PC (Poly Carbonate).

A diverter 139 is disposed at an upper side of the self-light emission type second lamp 138. The diverter 139 scatters light that is vertically incident to the side, thereby improving light uniformity. The reflection plate 133 reflects a portion of light scattered by the diverter 139 thereby transmitting the light through the diffusion plate 123. The diverter 139 aligns with each self-light emission type second lamp 138. In addition, the diverter 139 is disposed at a lower surface of the light guide plate 135. Alternatively, the diverter 139 may be disposed at an upper surface of the light guide plate 135.

When the diverter 139 is formed on the upper surface of the light guide plate 135, an interval between the light guide plate 135 and the self-light emission type second lamp 138 can be reduced. In particular, the self-light emission type second lamp 138 and the diverter 139 may be separated at an interval, and as shown in FIG. 1, if the diverter 139 is disposed at a right upper portion of the self-light emission type second lamp 138, a distance between the self-light emission type second lamp 138 and the diverter 139 is obtained.

Meanwhile, if the diverter 139 is disposed on the upper surface of the light guide plate 135, the light guide plate 135 isolates the self-light emission type second lamp 138 from the diverter 139. Accordingly, a distance between the light guide plate 135 and the self-light emission type second lamp 138 may be reduced.

The above-described LCD device structure molecules promotes high luminance and molecules luminance uniformity with the passive emission type first lamps 128 generating green light. Moreover, because the self-light emission type second lamps 138 generate red and blue light, the above-described LCD device structure allows for high quality color reproduction.

A fluorescent lamp generating white light has the highest color reproduction in the green wavelength band. Thus, the passive emission type first lamps 128 which generates green light may be used.

Figure 5:
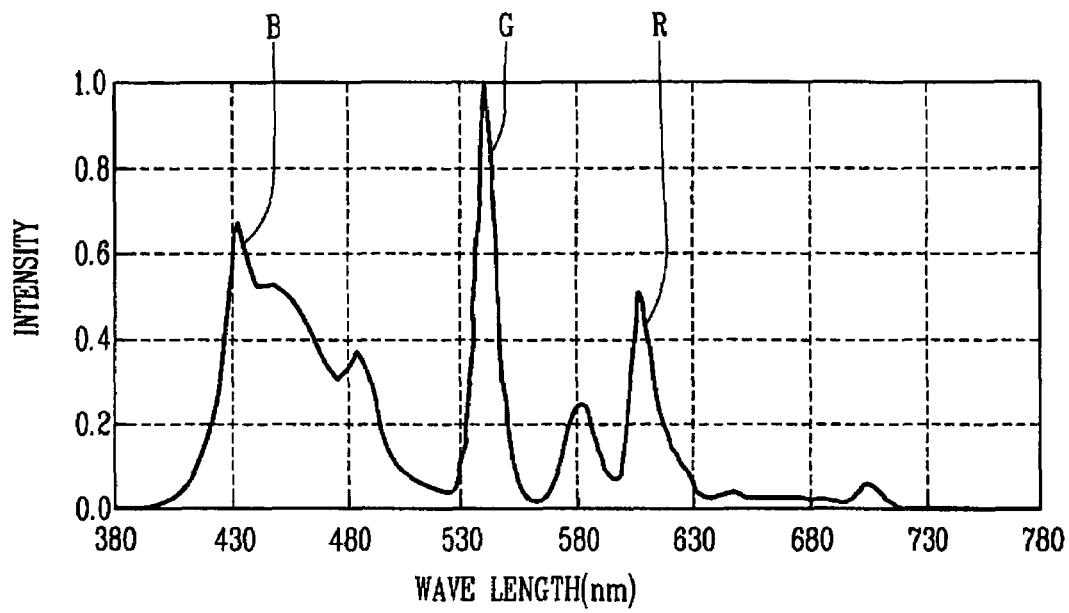
FIG. 5 is a graph showing a spectrum of a fluorescent lamp generating white light in accordance with the related art.

FIG. 5 is a graph showing a spectrum of a fluorescent lamp generating white light in accordance with the related art.

As shown in the graph, the white light generated from the fluorescent lamp is divided into R, G and B wavelength bands. The G wavelength band (530 nm~560 nm) has a single peak while the R wavelength band (580 nm~630 nm) and the B wavelength (400 nm~480 nm) have a plurality of peaks. The full width half maximum (FWHM) value at a point of half the size of the peak of the G wavelength band does not exceed about 10 nm, while the FWHM value of the R and B wavelength bands is 30 nm or above, so the G wavelength band has the greatest clarity. Herein, having a single peak and small FWHM value indicates high quality color reproduction. Furthermore, the waveform of the G wavelength band has a similar FWHM value as that of the waveforms for the LED or the EL.

Therefore, in the present invention, a fluorescent lamp generating a green light having the greatest sharpness, or clarity, among the R, G and B wavelengths is used and incorporated with a self-light emission type lamp which generates the red and blue light. Thus, a fluorescent lamp in accordance with the present invention has high color reproduction characteristics with respect to the R, G and B colors.

Figure 6:
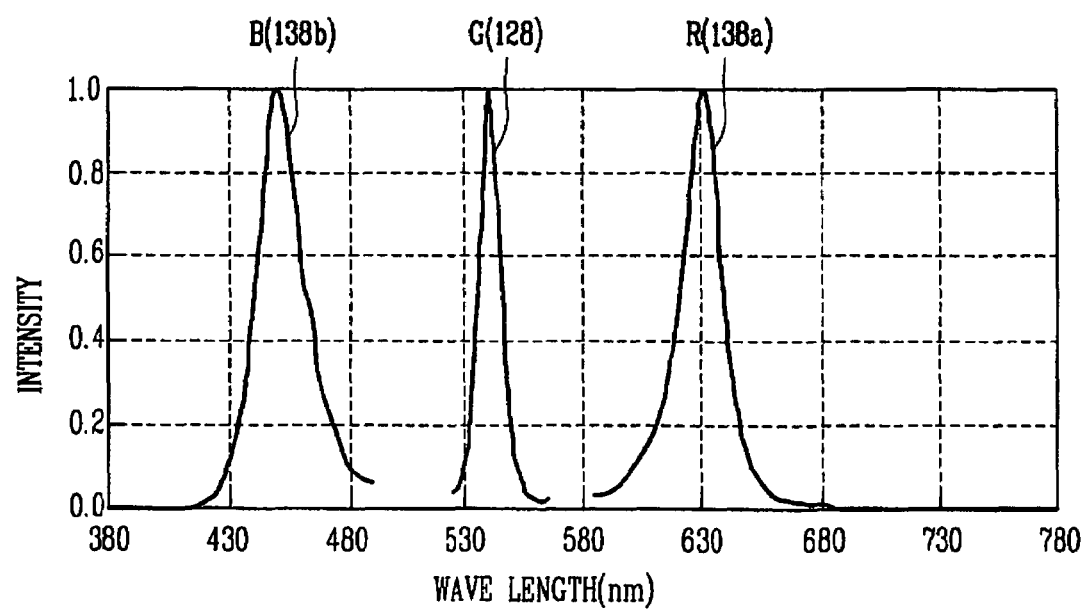
FIG. 6 is a graph showing a spectrum of a backlight in accordance with the present invention.

For example, as shown in FIG. 6, a graph which shows intensity according to a wavelength of light generated from the passive emission type first lamp 128 and the second lamps (R and B lamps) and the FWHM, all the 'G' wavelength band generated from the passive emission type first lamp 128, the R wavelength band generated from the R lamp 138a, and the B wavelength band generated from the B lamp 138b of the second lamps have a FWHM value of 20 nm or below.

Thus, because the R, G and B wavelengths are sharp (clear), high quality color reproduction can be accomplished and the entire luminance can be controlled with the fluorescent lamp (the first lamp).

Accordingly, the present invention provides a LCD device having high luminance, high color reproduction quality, and high picture quality.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit of an LCD device comprising: a light emitting unit including:
    a passive light emission type lamp that generates green light; and
    a self-light emission type lamp that generates red and blue light;
    a light guide plate disposed between the passive light emission type lamp and the self-light emission type lamp, the light guide plate mixing the red and blue light emitted from the self-light emission type lamp and guiding the mixed light to an upper side thereof;
    a reflection plate disposed below the self-light emission type lamp;
    a light scattering unit disposed above the passive light emission type lamp; and
    a diverter disposed above the self-light emission type lamp and scattering light that is perpendicularly incident to the self-light emission type lamp to the side, wherein the diverter is disposed at a rear surface of the light guide plate and aligns with the self-light emission type lamp.

2. The backlight unit of claim 1, wherein the passive light emission type lamp is a Cold Cathode Fluorescent Lamp (CCFL) or a Hot Cathode Fluorescent Lamp (HCFL).

3. The backlight unit of claim 1, wherein the self-light emission type lamp is an Electro Luminescence (EL) lamp or an Light Emitting Diode (LED).

4. The backlight unit of claim 1, wherein the light scattering unit comprises:
    a diffusion plate that disperses light incident to first and second light emitting units;
    a prism sheet that enhances a front side luminance of light reflected after the light is transmitted to an upper portion of the diffusion plate; and
    a protection sheet disposed at an upper portion of the prism sheet.

5. A liquid crystal display (LCD) device comprising:
    a liquid crystal panel; and
    a backlight unit that supplies light to the liquid crystal panel, the backlight unit comprising:
    a light emitting unit including a passive light emission type lamp that generates green light and a self-light emission type lamp that generates red and blue light;
    a light guide plate disposed between the passive light emission type lamp and the self-light emission type lamp, the light guide plate mixing the red and blue light emitted from the self-light emission type lamp and guiding the mixed light to an upper side thereof;
    a reflection plate disposed below the self-light emission type lamp;
    a light scattering unit disposed above the passive light emission type lamp; and
    a diverter disposed above the self-light emission type lamp and scattering light that is perpendicularly incident to the self-light emission type lamp to the side, wherein the diverter is disposed at a rear surface of the light guide plate and aligns with the self-light emission type lamp.

6. The liquid crystal display of claim 5, wherein the passive light emission type lamp is a Cold Cathode Fluorescent Lamp (CCFL) or a Hot Cathode Fluorescent Lamp (HCFL).

7. The liquid crystal display of claim 5, wherein the self-light emission type lamp is an Electro Luminescence (EL) lamp or an Light Emitting Diode (LED).

8. The liquid crystal display of claim 5, wherein the light scattering unit comprises:
    a diffusion plate that disperses light incident to first and second light emitting units;
    a prism sheet that enhances a front side luminance of light reflected after the light is transmitted to an upper portion of the diffusion plate; and
    a protection sheet disposed at an upper portion of the prism sheet.

9. A liquid crystal display (LCD) device comprising:
    a liquid crystal panel;
    a backlight unit including:
    a first light emitting unit having a passive light emission lamp that generates green light; and
    a second light emitting unit having a self-light emission lamp that generates red and blue light;
    a light guide plate between the first light emitting unit and the second light emitting unit;
    a reflection plate below the self-light emission lamp; and
    a diverter disposed above the self-light emission type lamp and scattering light that is perpendicularly incident to the self-light emission type lamp to the side, wherein the diverter is disposed at a rear surface of the light guide plate and aligns with the self-light emission type lamp.

10. The liquid crystal display of claim 9, wherein the passive light emission type lamp is a Cold Cathode Fluorescent Lamp (CCFL ) or a Hot Cathode Fluorescent Lamp (HCFL).

11. The liquid crystal display of claim 9, wherein the self-light emission type lamp is an Electro Luminescence (EL) lamp or an Light Emitting Diode (LED).

12. The liquid crystal display of claim 9, wherein the light scattering unit comprises:
    a diffusion plate that disperses light incident to the first and second light emitting units;
    a prism sheet that enhances a front side luminance of light reflected after the light is transmitted to an upper portion of the diffusion plate; and
    a protection sheet disposed at an upper portion of the prism sheet.

* * * * *